(12) United States Patent　　　　　　(10) Patent No.:　US 12,589,803 B2

McGrory et al.　　　　　　　　　　　　(45) Date of Patent:　　Mar. 31, 2026

(54) OBSTACLE AVOIDANCE USING VEHICULAR ACTIVE REAR STEERING

(71) Applicant: GM GLOBAL TECHNOLOGY OPERATIONS LLC, Detroit, MI (US)

(72) Inventors: Jackson B. McGrory, Toronto (CA); Patrick DiGioacchino, Niagara Falls (CA); Utkarsh Saini, Pickering (CA); Halit Zengin, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/828,346

(22) Filed: Sep. 9, 2024

(65) Prior Publication Data

US 2026/0070612 A1　　Mar. 12, 2026

(51) Int. Cl.
*B62D 15/02*　　　　(2006.01)
*B60K 35/28*　　　　(2024.01)

(52) U.S. Cl.
CPC .......... *B62D 15/0265* (2013.01); *B60K 35/28* (2024.01); *B62D 15/021* (2013.01); *B60K 2360/16* (2024.01)

(58) Field of Classification Search
CPC .. B62D 15/0265; B62D 15/021; B60K 35/25; B60K 2360/16
See application file for complete search history.

(56) References Cited

U.S. PATENT DOCUMENTS 9,527,528　B1 *　12/2016　Harrison ................ B62D 13/00
2008/0086269　A1 *　4/2008　Joe ......................... B60W 30/09
　　　　　　　　　　　　　　　　　　　　　701/301

FOREIGN PATENT DOCUMENTS

DE　　　102012203228 A1　　9/2013
DE　　　102022101057 A1　　7/2023

* cited by examiner

*Primary Examiner* — Jacob M Amick

(74) *Attorney, Agent, or Firm* — Quinn IP Law

(57) ABSTRACT

A system and method for obstacle collision avoidance using vehicular active rear steering is presented. The system and method include determining a front steering angle of a vehicle applied by a driver and an associated rear steering angle of the vehicle configured with active rear steering. Using sensors within the vehicle, a location of an obstacle is detected where, based on the front steering angle of the vehicle and the associated rear steering angle of the vehicle, a path of the vehicle is predicted. Based on the path of the vehicle and the location of the obstacle, a collision between the vehicle and the obstacle is predicted and an adjusting rear steering command is calculated to modify the path of the vehicle to avoid the predicted collision with the obstacle by sending the adjusting steering commands to steering actuators.

20 Claims, 15 Drawing Sheets

For each obstacle detected
1010

Calculate obstacle polar angle
$\theta_i = tan^{-1} x_{0i}/y_{0i}$
1015

$\theta_i > K_\theta$?
1020

Yes → Ignore Obstacle
1025

No

Obstacle on inside of curve
1030

Yes → Check for collision with inside edge
1035

No $x_{0i} > L$?
1040

Yes → Check for collision with front bumper
1045

No

Check for collision rear bumper
1050

1300

1400

1500

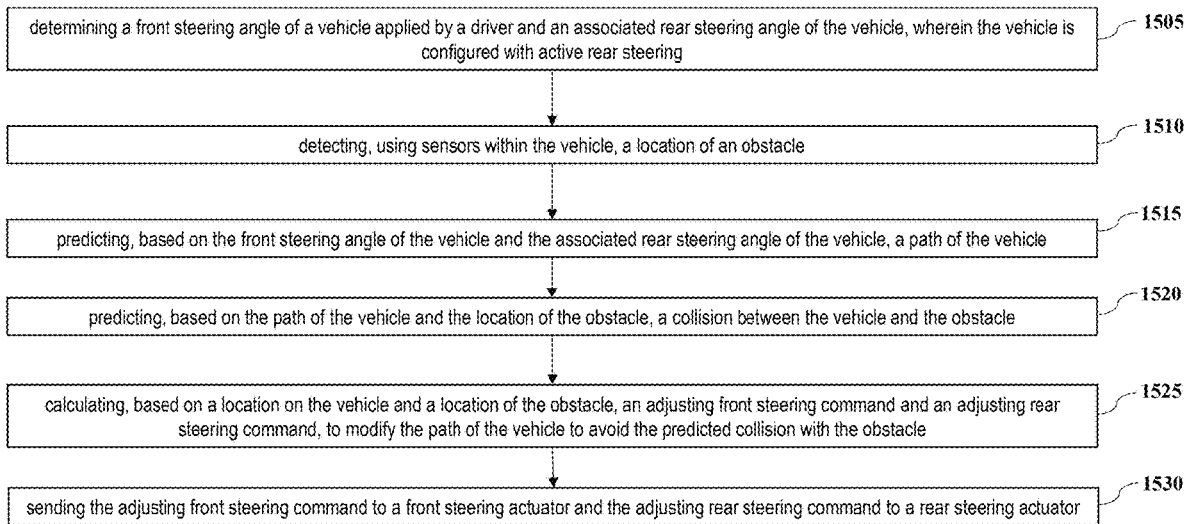

determining a front steering angle of a vehicle applied by a driver and an associated rear steering angle of the vehicle, wherein the vehicle is configured with active rear steering — 1505 detecting, using sensors within the vehicle, a location of an obstacle — 1510 predicting, based on the front steering angle of the vehicle and the associated rear steering angle of the vehicle, a path of the vehicle — 1515 predicting, based on the path of the vehicle and the location of the obstacle, a collision between the vehicle and the obstacle — 1520 calculating, based on a location on the vehicle and a location of the obstacle, an adjusting front steering command and an adjusting rear steering command, to modify the path of the vehicle to avoid the predicted collision with the obstacle — 1525 sending the adjusting front steering command to a front steering actuator and the adjusting rear steering command to a rear steering actuator — 1530

FIG. 15

OBSTACLE AVOIDANCE USING VEHICULAR ACTIVE REAR STEERING

INTRODUCTION

Vehicles are a staple of everyday life. Special use cameras, microcontrollers, laser technologies, and sensors may be used in many different applications in a vehicle. Cameras, microcontrollers, and sensors may be utilized in enhancing automated structures that offer state-of-the-art experience and services to the customers, for example in tasks such as body control, steering control, camera vision, information display, security, autonomous controls, etc. Further, functions utilizing multiple image sensors may be used in situations to detect and react to objects, such as pedestrians, objects, and other vehicles, which may have a bearing on the operation of a vehicle.

Vehicles may use multiple cameras, which may produce a 360-degree overhead perspective of the vehicle and the area surrounding the vehicle, including possible obstructions and obstacles. Such a perspective may assist the driver in various maneuvers such as parking or navigating around different objects. In addition, cameras may be used to detect objects and initiate evasive maneuvers if appropriate. However, cameras may also detect objects where the vehicle is on an unavoidable collision path. Short of stopping the vehicle there may not exist an alternative solution.

Accordingly, it is desirable to provide collision avoidance with the use of automated vehicular active rear steering to avoid a detected obstacle.

SUMMARY

Disclosed herein are systems and methods for obstacle collision avoidance using vehicular active rear steering. A method for obstacle collision avoidance using vehicular active rear steering may include determining a front steering angle of a vehicle applied by a driver and an associated rear steering angle of the vehicle, where the vehicle includes active rear steering. The method may also include detecting, using sensors within the vehicle, a location of an obstacle and predicting, based on the front steering angle of the vehicle and the associated rear steering angle of the vehicle, a path of the vehicle. The method may then include predicting, based on the path of the vehicle and the location of the obstacle, a collision between the vehicle and the obstacle and then calculating, based on a location on the vehicle and a location of the obstacle, an adjusting rear steering command, to modify the path of the vehicle to avoid the predicted collision with the obstacle. The method may further include sending the adjusting rear steering command to a rear steering actuator.

Another aspect of the disclosure may be a method further including calculating, based on the location on the vehicle and the location of the obstacle, an adjusting front steering command to modify the path of the vehicle to avoid the predicted collision with the obstacle, and sending the adjusting front steering command to a front steering actuator.

Another aspect of the disclosure may be a method further including comparing the adjusting front steering command with a front steering actuator constraint and the adjusting rear steering command with a rear steering actuator constraint.

Another aspect of the disclosure may be a method further including detecting, using the sensors within the vehicle, a location of a second obstacle and determining a possible collision between the vehicle and the second obstacle based on a modified path of the vehicle.

Another aspect of the disclosure may be a method further including generating a warning message if either the front steering command exceeds a threshold value of the front steering actuator constraint or the rear steering command exceeds a threshold value of the rear steering actuator constraint.

Another aspect of the disclosure may be a method where detecting the potential obstacle further includes filtering, based on a relative position of a predicted collision with the obstacle to the vehicle, a relevance of the potential obstacle.

Another aspect of the disclosure may be a method further including classifying a position of the predicted collision on the vehicle consisting of an inner edge of the vehicle, an outer front corner of the vehicle, or an outer rear corner of the vehicle.

Another aspect of the disclosure may be a method further including displaying the predicted path of the vehicle with the obstacle.

Another aspect of the disclosure may be a method further including displaying a modified the path of the vehicle to avoid the predicted collision with the obstacle.

Another aspect of the disclosure may be a method further including automatically generating, without manual intervention, the adjusting front steering command and the adjusting rear steering command.

Another aspect of the disclosure may be a method further including inhibiting the rear steering actuator to avoid a collision, wherein the rear steering actuator comprises a binary control.

Another aspect of the disclosure may be a method where the rear steering actuator includes a full authority control.

Another aspect of the disclosure may be a method where the front steering actuator includes a steer-by-wire control.

Another aspect of the disclosure may include a system for obstacle collision avoidance using vehicular active rear steering that includes a vehicle configured with active rear steering where a front steering angle of a vehicle is determined by a driver and where the vehicle is may produce an associated rear steering angle of the vehicle. The system may also include sensors located within the vehicle to detect a location of an obstacle and a processor to predict, based on the front steering angle of the vehicle and the associated rear steering angle of the vehicle, a path of the vehicle. In addition, the processor may predict, based on the path of the vehicle and the location of the obstacle, a collision between the vehicle and the obstacle and then calculate, based on a location on the vehicle and a location of the obstacle, an adjusting front steering command and an adjusting rear steering command, to modify the path of the vehicle to avoid the predicted collision with the obstacle. The system may further include a front steering actuator to receive the adjusting front steering command and a rear steering actuator to receive the adjusting rear steering command.

Another aspect of the system may include where the adjusting rear steering command includes positioning the rear steering actuator anti-phase to a positioning of the front steering actuator.

Another aspect of the system may include where the processor may generate a warning message if either the front steering command exceeds a threshold value of the front steering actuator constraint or the rear steering command exceeds a threshold value of the rear steering actuator constraint.

Another aspect of the system may include a display system for displaying the predicted path of the vehicle with the obstacle.

Another aspect of the system may include where the rear steering actuator includes a binary control.

Another aspect of the system may include where the front steering actuator includes a steer-by-wire control.

Another aspect of the disclosure may include a method for obstacle collision avoidance using vehicular active rear steering that includes determining a front steering angle of a vehicle applied by a driver and an associated rear steering angle of the vehicle, where the vehicle includes active rear steering. The method may include detecting, using sensors within the vehicle, a location of an obstacle and predicting, based on the front steering angle of the vehicle and the associated rear steering angle of the vehicle, a path of the vehicle. Further, the method may include predicting, based on the path of the vehicle and the location of the obstacle, a collision between the vehicle and the obstacle. The method may also include classifying a position of the predicted collision on the vehicle consisting of an inner edge of the vehicle, an outer front corner of the vehicle, or an outer rear corner of the vehicle. The method may also include calculating, based on a location on the vehicle and a location of the obstacle, an adjusting front steering command and an adjusting rear steering command, to modify the path of the vehicle to avoid the predicted collision with the obstacle and comparing the adjusting front steering command with a front steering actuator constraint and the adjusting rear steering command with a rear steering actuator constraint. The method may include displaying the predicted path of the vehicle with the obstacle and sending the adjusting front steering command to a front steering actuator and the adjusting rear steering command to a rear steering actuator. The method may further include displaying a modified path of the vehicle to avoid the predicted collision with the obstacle and also generating a warning message if either the front steering command exceeds a threshold value of the front steering actuator constraint or the rear steering command exceeds a threshold value of the rear steering actuator constraint. The method may also include detecting, using the sensors within the vehicle, a location of a second obstacle and determining a possible collision between the vehicle and the second obstacle based on the modified path of the vehicle.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 15 depicts a method of obstacle collision avoidance using vehicular active rear steering, in accordance with the disclosure.

Figure 1:
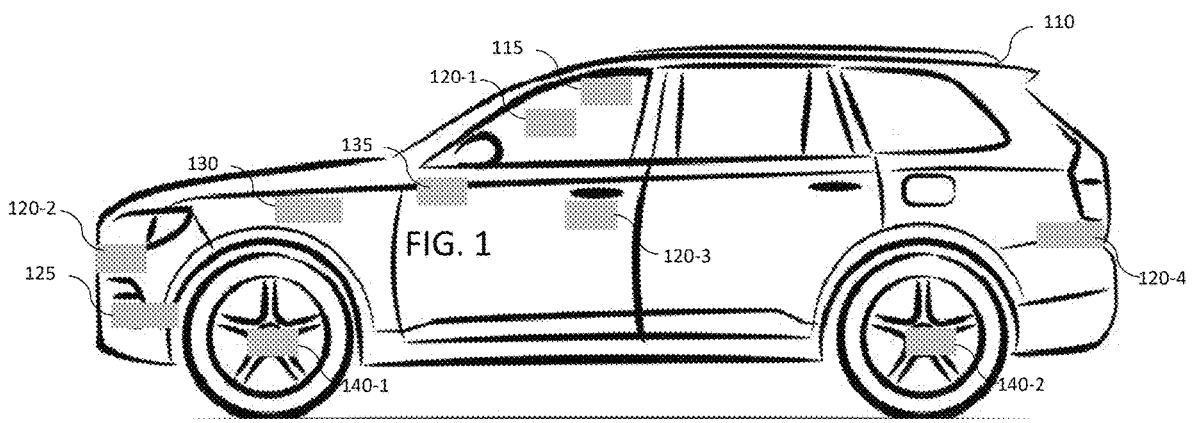
FIG. 1 is an illustration of a variety of possible vehicle sensors, in accordance with the disclosure.

The appended drawings are not necessarily to scale and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
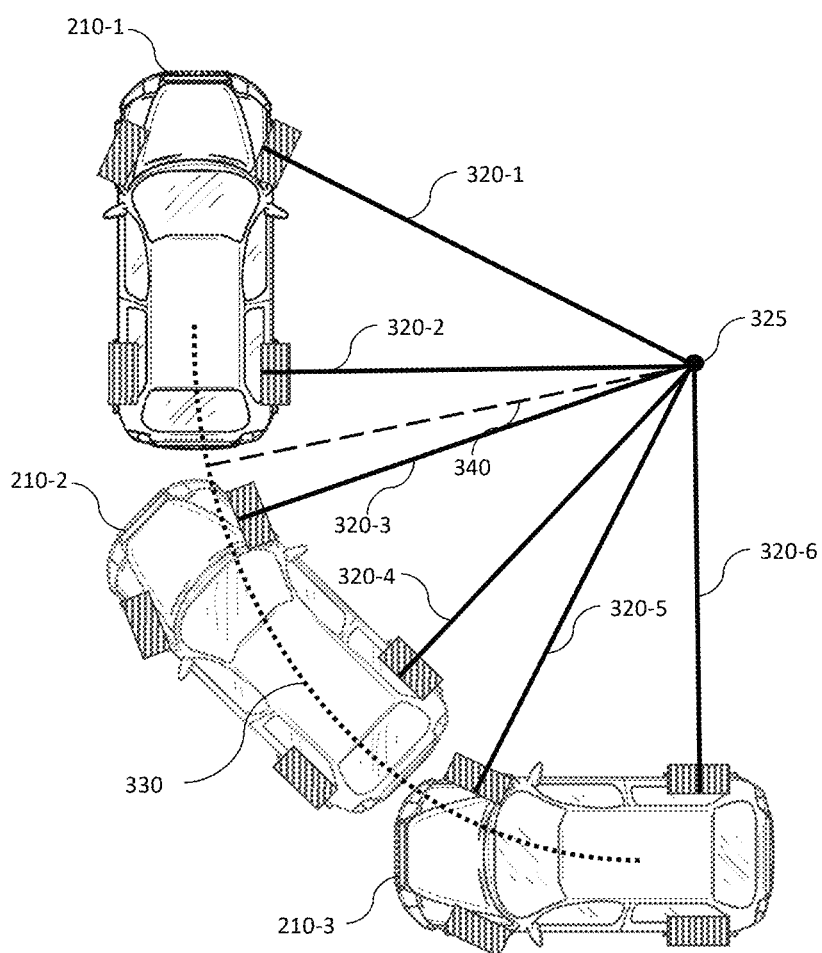
FIG. 3 is an illustration of a vehicle turn radius without active rear steer, in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110*a*" and "110*b*" may indicate two different input devices which may be functionally the same, but may be located at different points in a simulation arena).

Vehicles have become computationally advanced and equipped with multiple microcontrollers, cameras, sensors, processors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and automatic braking that may depend on information obtained from cameras and sensors on a vehicle. Such information may be combined and utilized to assist or automate a collision avoidance maneuver, for example the use active rear steering.

FIG. 1 is an illustration of a vehicle with integrated sensors 100, according to an embodiment of the present disclosure. Such sensors may assist in the use of automated functions, such as autonomous driving and, as discussed, the ability to initiate and assist or automate a collision avoidance maneuver. For example, vehicle 110 may include a Light Detection And Ranging (Lidar) sensor 115, an inward or outward camera sensor 120 (as shown by camera sensor 120-1-120-4), an ultrasonic sensor 125, an inertial measurement unit (IMU) sensor 130, a steering angle sensor 135, and wheel speed sensors 140-1 and 140-2, to name a few. Camera sensor 120 may also include multiple camera sensors placed around and throughout the vehicle, for example, camera sensor 120-1 mounted by the windshield facing forward, camera sensor 120-2 located at the front of the vehicle, facing forward, camera sensor 120-3 located at the left-side of the vehicle (with another side mounted camera sensor located at the right-side of the vehicle (not shown)), and camera-sensor 120-4 located at the rear of the vehicle. Other additional cameras and sensors at other locations may also be possible to provide additional views and/or operations.

Images from camera sensors 120 may detect one or more obstacles, especially obstacles that may not be visible by a driver, for example low posts, high curbs, etc. Processors within the vehicle may determine that there is a potential collision between the vehicle and a detected obstacle. The obstacle may also be another vehicle, a pedestrian, or other moving or stationary object. Surround sensing, such as ultrasonics, Lidar, and various types of cameras may be used to detect objects in a three-hundred-sixty-degree perimeter around the vehicle.

Further, processors within the vehicle may be used to determine a path of the vehicle and the potential for a collision with an obstacle. In addition, the processors may also determine if the obstacle may be avoided through the use of active rear steering, or a combination of active rear steering and adjusted front steering. However, typically active rear steering may default to an anti-phase position, for example when the front steering is angled to the right the left steering will be angled to the left in a proportional amount. For example, at a 6:1 ratio the front angle if set to 30 degrees would set the rear angle to a 5-degree offset. The steering effects of an in-phase and anti-phase relationship between the front and rear steering will be discussed in FIG. 2 through FIG. 8. The given proportional examples are merely examples to convey an idea and not meant to be limiting.

Figure 2:
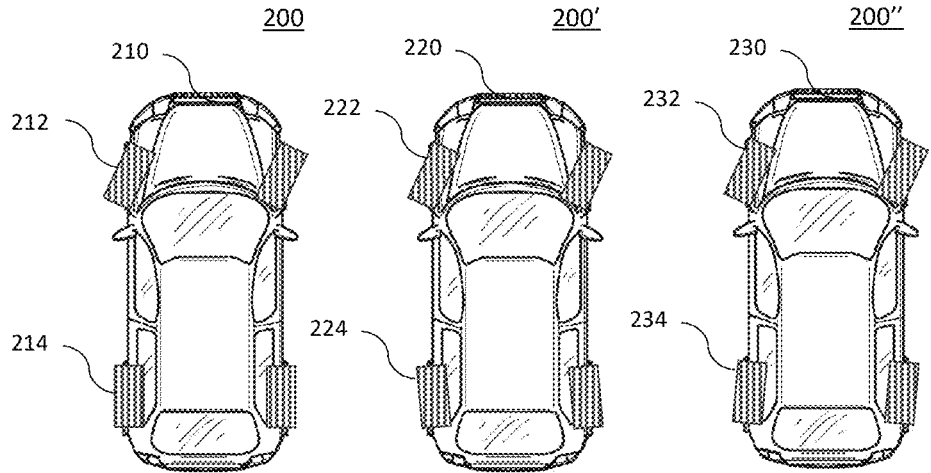
FIG. 2 is an illustration of various positions of a vehicle's rear wheels equipped with active rear steering, in accordance with the disclosure.

FIG. 2 illustrates three examples of front and rear steering positioning, according to an embodiment of the present disclosure. For example, configuration 200 illustrates vehicle 210 with front wheels 212 angled 25 degrees to the right with the rear wheels 214 at a zero-degree offset. Configuration 200 may represent a vehicle that is not equipped with active rear steering, or with active rear steering at a zero-degree offset. Configuration 200' illustrates vehicle 220 with front wheels 222 angled 25 degrees to the right with the rear wheels 224 at a five-degree offset to the left. For this disclosure when the front wheels are angled in one direction and the rear wheels are angled in the opposite direction, for example from wheels angled to the right with the rear wheels angled to the left, such a relationship may be referred to as being in anti-phase to each other. In contrast, configuration 200" illustrates vehicle 230 with front wheels 232 angled twenty-five degrees to the right with the rear wheels 234 at a five-degree offset to the right, e.g., in-phase. Further, the proportional 5:1 relationship between front and rear wheel relationships shown in configuration 200' and 200" are just examples and may consist of other values without deviating from the scope of this disclosure.

As will be discussed further in later figures, when the front and rear wheels turn in an anti-phase relationship, the effect will be to shorten the turn radius of the vehicle and move the turn center of the vehicle, which is some scenarios may bring the vehicle closer to an obstacle, for example if an obstacle is present on the outer side of a turn.

FIGS. 3-7 are directed to illustrate the different associated turn radiuses and turn centers of a vehicle without active rear steering, with active in phase rear steering, and with active anti-phase rear steering.

FIG. 3 is an illustration of vehicle 210, shown in positions 210-1, 210-2, and 210-3, with no active rear steering making a turn with the front wheels angled to the right at a 25-degree angle, according to an embodiment of the present disclosure. Since vehicle 210 has no active rear steering the rear wheels maintain a zero-degree offset. Starting at vehicle position 210-1, the turn radius may be observed from vector 320-1 based on the angle of the front wheel and vector 320-2 from the back wheel that intersect at origin 325. Continuing to the next illustrated turn vehicle position 210-2, the turn radius may again be observed from vector 320-3 based on the angle of the front wheel and vector 320-4 from the back wheel that intersect at origin 325. Continuing to the next illustrated turn vehicle position 210-3, the turn radius may again be observed from vector 320-5 based on the angle of the front wheel and vector 320-6 from the back wheel that intersect at origin 325. Given that the front wheels maintained the same angle throughout the turn the arc path 330 indicates the path of vehicle 210 with a turn radius of 340.

Figures 4A, 4B:
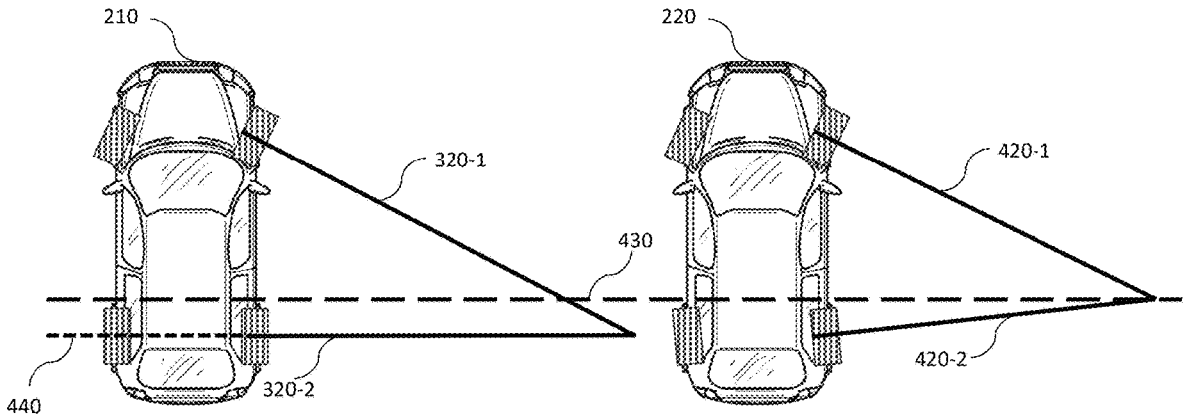
FIGS. 4A and 4B present a comparison of a vehicle's turn radius and turn center with and without active rear steer, in accordance with the disclosure.

FIG. 4A is an illustration of a vehicle 210's turn radius and turn center as compared to vehicle 210's turn radius and turn center with active rear steering, according to an embodiment of the present disclosure. As shown in FIG. 3, vehicle 210, without active rear steering, illustrates a turn radius formed by vector 320-1 and vector 320-2, which are the same as vector 320-3 and vector 320-4, and vector 320-5 and vector 320-6, respectively. FIG. 4A also illustrates turn center 440 of vehicle 210, here shown in front of the rear axle. In comparison, FIG. 4B illustrates vehicle 220 with active rear steering, here shown in an anti-phase position with the front steering. For example, the front wheels may be angled to the right by 25 degrees with the rear wheels angled to the left by five degrees. By angling the rear wheels the turn radius, shown by vector 420-1 and vector 420-2, is shorter than the turn radius for vehicle 210 in FIG. 4A without active rear steering. Further, the turn center 430 of vehicle 220 is moved forward of the rear axle as shown by turn center 430 versus turn center 440.

Figure 5:
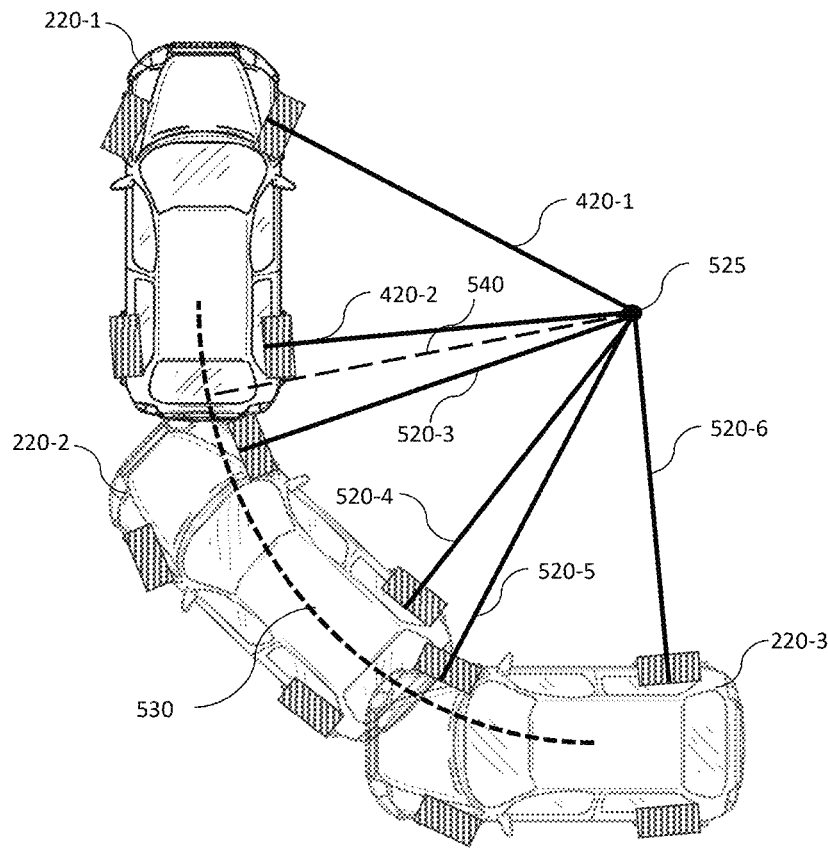
FIG. 5 is an illustration of a vehicle turn radius with active rear steer in anti-phase with the front steering, in accordance with the disclosure.
Figure 6:
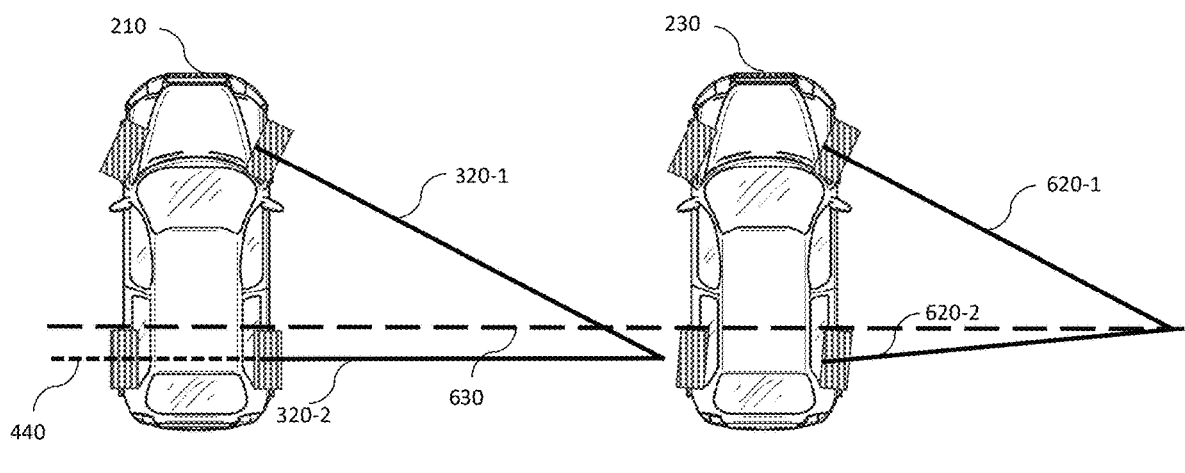
FIGS. 6A and 6B present a comparison of a vehicle's turn radius and turn center with and without active rear steer, in accordance with the disclosure.

FIG. 5 is an illustration of vehicle 220, shown in positions 220-1, 220-2, and 220-3, with anti-phase active rear steering making a turn with the front wheels angled to the right at a 25-degree angle, according to an embodiment of the present disclosure. FIG. 5 illustrates vehicle 220 with active rear steering where the rear wheels maintain a five-degree offset to the left. Starting at vehicle position 220-1, the turn radius may be observed from vector 420-1 based on the angle of the front wheel and vector 420-2 from the back wheel that intersect at origin 525. Continuing to the next illustrated turn vehicle position 220-2, the turn radius may again be observed from vector 520-3 based on the angle of the front wheel and vector 520-4 from the back wheel that intersect at origin 525. Continuing to the next illustrated turn vehicle position 220-3, the turn radius may again be observed from vector 520-5 based on the angle of the front wheel and vector 520-6 from the back wheel that intersect at origin 525. Given that the front and rear wheels maintained the same angle throughout the arc path 530 indicates the path of vehicle 220 with a turn radius of 540. Notice that with active rear steering the turn radius 540 is shorter than turn radius 340 of vehicle 210 without the use of active rear steering.

FIG. 6A is an illustration of a vehicle 210 turn radius and turn center as compared to vehicle 230's turn radius and turn center with active rear steering, according to an embodiment of the present disclosure. As shown in FIG. 3, vehicle 210, without active rear steering, illustrates a turn radius formed by vector 320-1 and vector 320-2, which are the same as vector 320-3 and vector 320-4, and vector 320-5 and vector 320-6, respectively. FIG. 6A also illustrates turn center 440 of vehicle 210, here shown in front of the rear axle. In comparison, FIG. 6B illustrates vehicle 230 with active rear steering, here shown in an in-phase position with the front steering. For example, the front wheels may be angled to the right by 25 degrees with the rear wheels angled to the right by five degrees. By angling the rear wheels the turn radius, shown by vector 620-1 and vector 620-2, is longer than the turn radius for vehicle 210 in FIG. 6A without active rear steering. Further, the turn center 630 of vehicle 220 is moved rearwards just behind the rear axle as shown by turn center 630 versus turn center 440.

Figure 7:
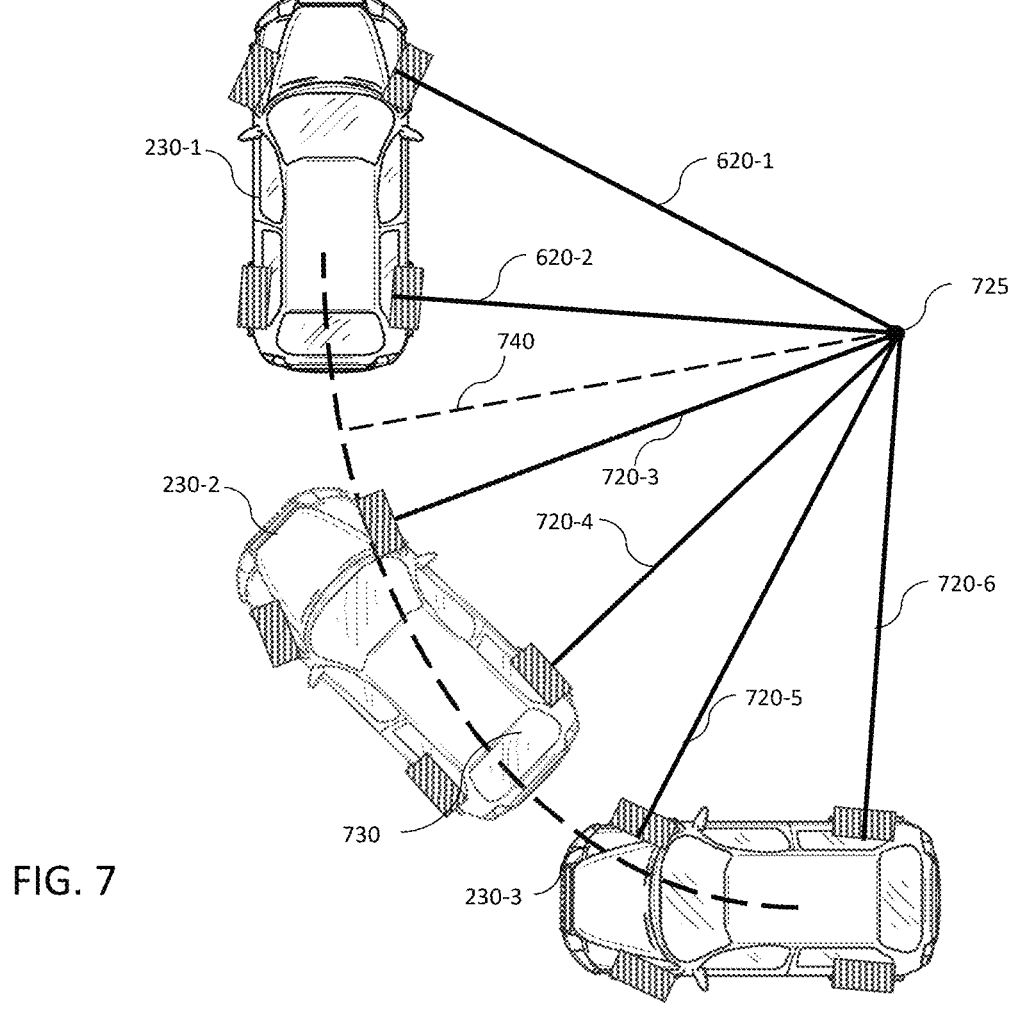
FIG. 7 is an illustration of a vehicle turn radius with active rear steer in-phase with the front steering, in accordance with the disclosure.
Figure 8:
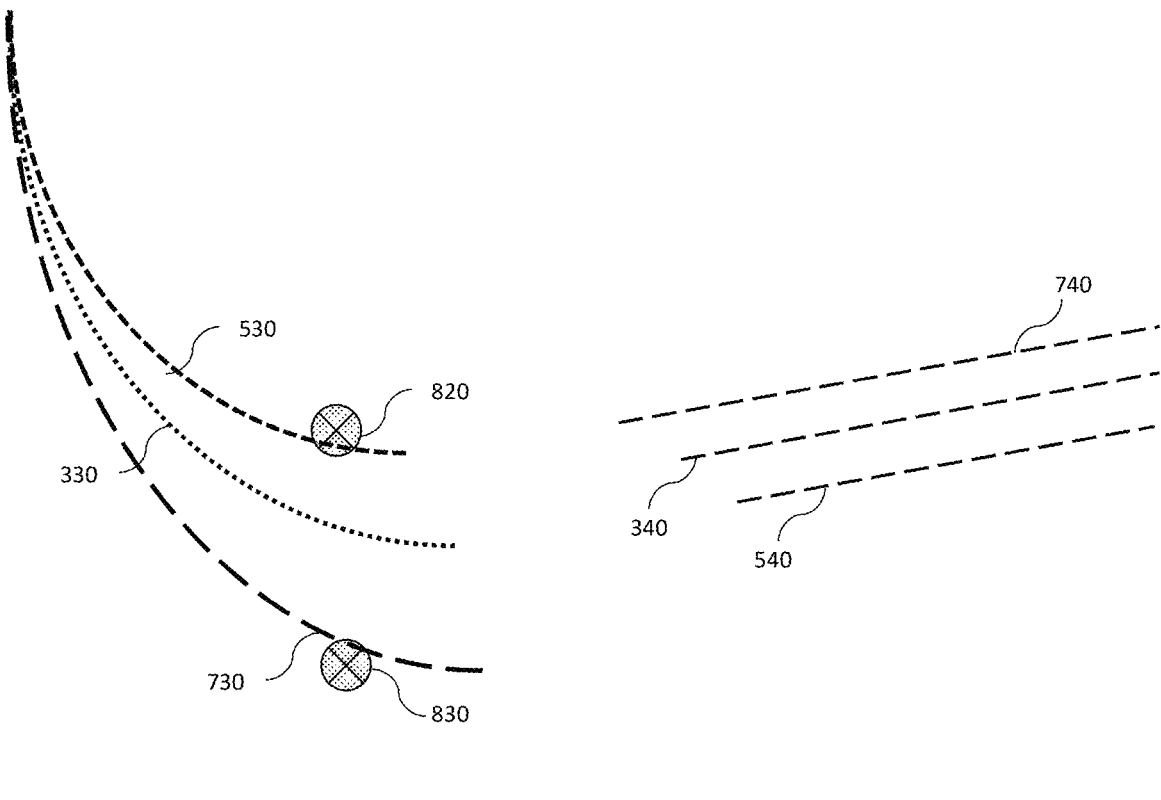
FIGS. 8A and 8B are illustrations of a vehicle's turn radius and arc path of a vehicle without active rear steer, with active rear steer in anti-phase with the front steering, and with active rear steer in-phase with the front steering in accordance with the disclosure.

FIG. 7 is an illustration of vehicle 230, shown in positions 230-1, 230-2, and 230-3, with in-phase active rear steering making a turn with the front wheels angled to the right at a 25-degree angle, according to an embodiment of the present disclosure. FIG. 7 illustrates vehicle 230 with active rear steering where the rear wheels maintain a five-degree offset to the right. Starting at vehicle position 230-1, the turn radius may be observed from vector 620-1 based on the angle of the front wheel and vector 620-2 from the back wheel that intersect at origin 725. Continuing to the next illustrated turn vehicle position 230-2, the turn radius may again be observed from vector 720-3 based on the angle of the front wheel and vector 720-4 from the back wheel that intersect at origin 725. Continuing to the next illustrated turn vehicle position 230-3, the turn radius may again be observed from vector 720-5 based on the angle of the front wheel and vector 720-6 from the back wheel that intersect at origin 725. Given that the front and rear wheels maintained the same angle throughout the arc path 730 indicates the path of vehicle 230 with a turn radius of 740. Notice that with active rear steering the turn radius 740 is longer than turn center 440 of vehicle 210 without the use of active rear steering.

FIGS. 8A and 8B compare the arc paths and turn radiuses of the vehicles illustrated in FIGS. 2-7, according to an embodiment of the present disclosure. For example, FIG. 8A illustrates arc path 330 of vehicle 210 without the use of active rear steering. Arc path 530 illustrates the path of vehicle 220 with the use of anti-phase active rear steering and arc path 730 illustrates the path of vehicle 230 with the use of in-phase active rear steering.

FIG. 8A also illustrates the use of obstacles, for example obstacle 820 and obstacle 830. If a vehicle is equipped with active anti-phase rear steering and is backing out of a parking space following arc path 530, while the anti-phase rear steering may provide a tighter turn, in this scenario such an assist would be detrimental as arc path 530 may lead to a collision with obstacle 820. In a similar manner, if a vehicle is equipped with active in-phase rear steering and is backing out of a parking space following arc path 730, while the in-phase rear steering may provide a wider turn, in this scenario such an assist would be detrimental as arc path 730 may lead to a collision with obstacle 830. Thus, as will be discussed in the following figures, detection of obstacles and the use of an active rear steering in an appropriate direction may lead to an avoidance of the obstacle.

FIG. 8B illustrates the turn radiuses associated with arc paths 330, 530, and 730. For example, the "middle" turn radius 340 of a vehicle with no active rear steer, or where the rear steering angle is set to zero, in which the rear wheel angle does not change in response to the front steering angle. As shown, the larger turn radius 740 is associated with in-phase rear steering and the smaller turn radius 540 is associated with anti-phase rear steering.

Figure 9:
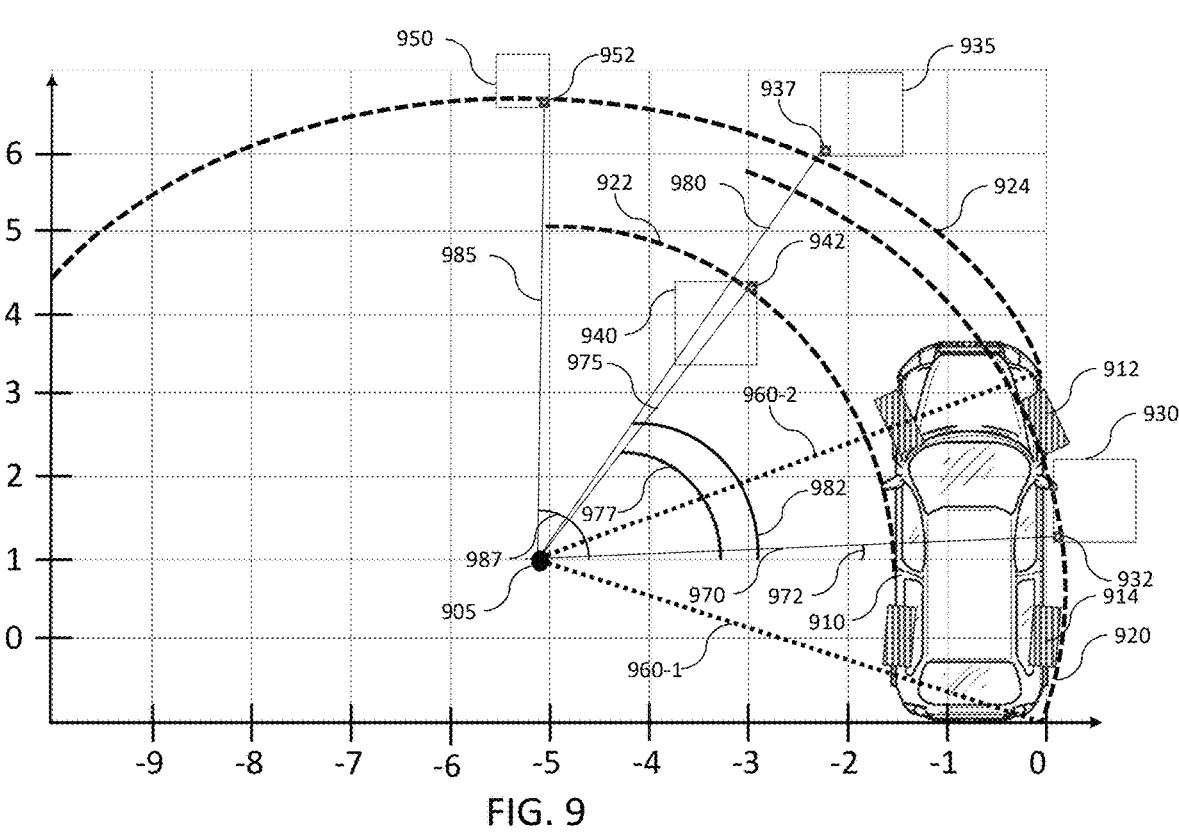
FIG. 9 is an illustration of a vehicle with active rear steer and with inside and outside edge collision checking, in accordance with the disclosure.

FIG. 9 illustrates a possible scenario 900 of a vehicle with active rear steering and the presence of obstacles with inside and outside edge collision checking, according to an embodiment of the present disclosure. Scenario 900 includes vehicle 910 with a coordinate frame overlay origin on its outer rear wheel. Vehicle 910 is shown with front wheels 912 angled at twenty-five degrees to the left with its rear wheels 914 angled at five degrees to the right. Vehicle 910, with its illustrated wheel positions, has a turn center 905 and a turn radius defined by vector 960-1 and vector 960-2. Arc path 924 illustrates the path of its widest front bumper. Arc path 920 illustrates the path of the right front wheel and arc path 922 illustrates the path of the left rear wheel.

Scenario 900 also includes four obstacles with obstacle 930, obstacle 935, obstacle 940, and obstacle 950. Rather than tracking and analyzing the entire obstacle, scenario 900 tracks and analyzes the edge/point of a possible collision between an obstacle and the vehicle. Therefore, for example, point 932 of obstacle 930 may be used for collision analysis and associated with a corresponding $(x_{0i}, y_{0i})$ value, thus for obstacle 930 a value of $(x_{01}, y_{01})$. In the same manner point 937 of obstacle 935 may be used for collision analysis with a value of $(x_{02}, y_{02})$, point 942 of obstacle 940 may be used for collision analysis with a value of ($x_{03}$, $y_{03}$), and point 952 of obstacle 950 may be used for collision analysis with a value of ($x_{04}$, $y_{04}$). Based on points 932, 937, 942, and 952 an obstacle length from the turn center to the obstacle point and an obstacle polar angle to the obstacle point may be defined.

Thus, the first obstacle point 932 is associated with obstacle length 970 and obstacle polar angle 972. The second obstacle point 937 is associated with obstacle length 980 and obstacle polar angle 982. The third obstacle point 942 is associated with obstacle length 975 and obstacle polar angle 977. And the fourth obstacle point 952 is associated with obstacle length 985 and obstacle polar angle 987. These coordinates and points may be used in FIG. 10 as part of a method of collision detection for an inside and outside vehicle edge.

Figure 10:
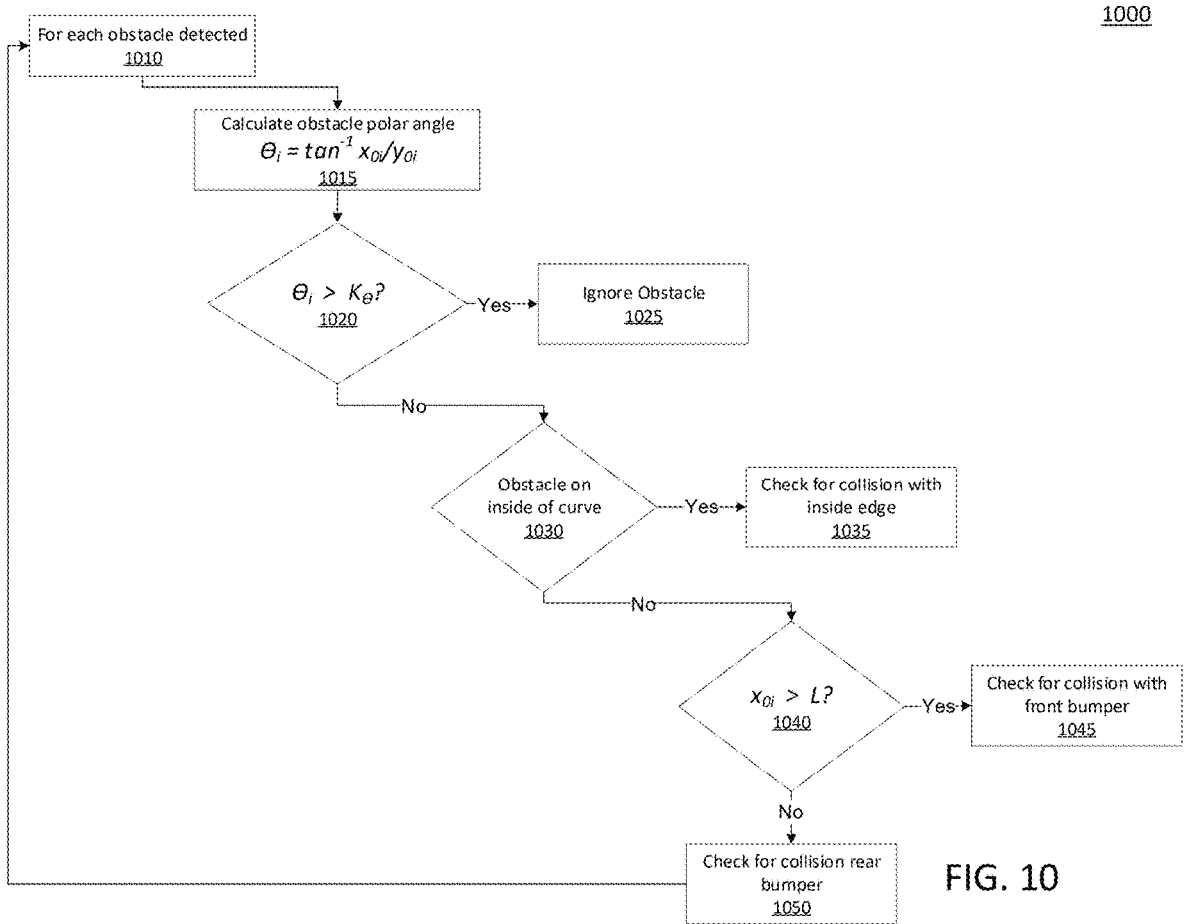
FIG. 10 is a flowchart of collision detection for inside and outside vehicle edge, in accordance with the disclosure.

FIG. 10 is a flowchart 1000 of collision detection for an inside and outside vehicle edge, according to an embodiment of the present disclosure. Flowchart 1000 may start at step 1010 with an analysis of each detected object, for example as indicated by ($x_{0i}$, $y_{0i}$). For example, FIG. 9 illustrates the existence of four detected objects. As will be discussed, priority may be given to the analysis of objects closer to a vehicle as there may be a possibility that the vehicle may adjust their steering before approaching another obstacle and thus may make further adjustments either more critical or moot.

At step 1015 a polar angle may be calculated for each object. As shown a polar angle may be calculated for the first detected object, for example ($x_{01}$, $y_{01}$). Such a calculation may be illustrated as $\Theta_i = \tan^{-1} x_{0i}/y_{0i}$. At step 1020 determination may be made whether the polar angle is less than a particular threshold indicating that the obstacle may present a collision event with the vehicle. If the polar angle is greater than the threshold then that obstacle may be ignored, for example, in FIG. 9 the fourth obstacle, obstacle 950 may be ignored as polar angle 987 is approximately 90 degrees and may very well be greater than the threshold value.

Therefore, if the polar angle is not greater than the threshold value the process may continue to step 1030 at which point a determination may be made whether the obstacle is on the inside of the curve, for example obstacle three, obstacle 940. As obstacle 940 is in the inside of the turning curve then at step 1035 a determination may be made as to whether there is a possibility of a collision between the inside edge of the vehicle and the obstacle. If there is no detection of an obstacle on the inside of the turning curve, then at step 1040 a determination may be made as to whether the distance ($x_{0i}$) between a detected obstacle and the vehicle is greater than the length of the vehicle (L). Such a determination may be made by estimating the distance between the front bumper of the vehicle and the ($x_{0i}$, $y_{0i}$) coordinate of the obstacle, for example between the front bumper and the ($x_{02}$, $y_{02}$) coordinate of obstacle two, obstacle 935. If the longitudinal coordinate of the obstacle is greater than the length of the vehicle, L, then AT STEP 1045 a determination may be made if there is a possibility of a collision between the front bumper of the vehicle and the obstacle.

If the longitudinal coordinate of the obstacle is less than the length of the vehicle, L, then at step 1050 a determination may be made if there is a possibility of a collision between the rear bumper of the vehicle and the obstacle, for example obstacle one, obstacle 930.

Figure 11:
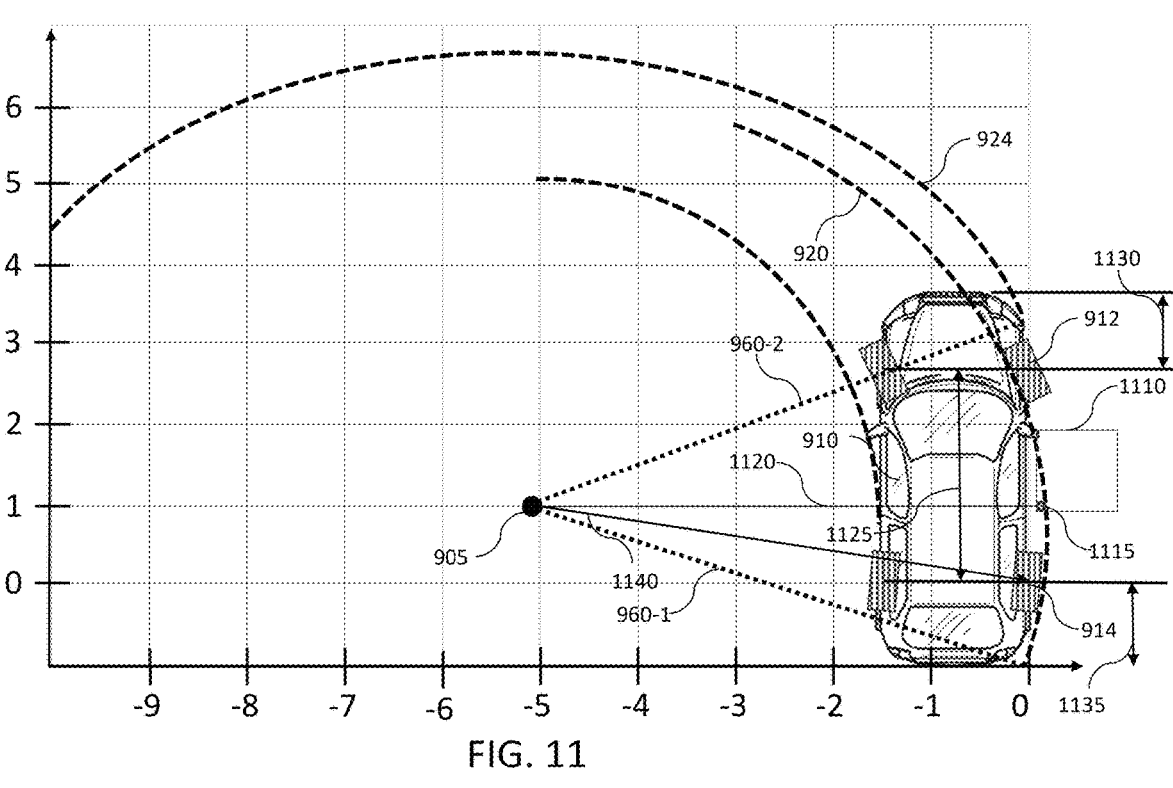
FIG. 11 is an illustration of a vehicle with active rear steer and with outside edge collision checking, in accordance with the disclosure.

FIG. 11 is an illustration of a vehicle scenario 1100 with active rear steer with outside edge collision checking, according to an embodiment of the present disclosure. FIG. 11 is based on FIG. 9 but is directed to collision checking on the outside edge of a vehicle. In addition to the applicable descriptions on FIG. 9, scenario 1100 illustrates an obstacle 1110 with its identifying point 1115 located at length 1120 from the turn center 905. FIG. 11 also illustrates the wheel-base length 1125, the length 1130 from the front axle to the front bumper, and the length 1135 from the rear axle to the rear bumper. Vehicle 910 may also be described as having front and rear steering angles, $\delta_f$ and $\delta_r$, respectively.

Given the front and rear steering angles and the detected object or obstacle 1110, treated as point 1115, the radius 1140 ($R_r$) from the turn center 905 to the right rear wheel may be expressed as:

$$R_r = \frac{L\cos\delta_f}{\sin(\delta_f - \delta_r)}$$

Where L=length 1120
Thereby defining the turn center coordinates as:

$$x_c = -R\sin\delta_r, \; y_c = R\cos\delta_r$$

Further, the widest turning points are corners of bumpers with distances $d_f$, for example length 1130, and $d_r$, for example length 1135, from their respective axles. The maximum radius, for example length of vector 960-1, may be represented as:

$$R_{max} = \sqrt{d_{f/r}^2 + R_r^2 + 2d_{f/r}R_r\sin\delta_r}$$

Further, to check for a possible collision is represented as:

$$L_o = \sqrt{(x_c - x_o)^2 + (y_c - y_o)^2}$$

Check for: $L_0 - R_{max} < K_{buffer}$, where if less than buffer, collision predicted.

Where $x_c$ is the x coordinate of the turn center and ye is the y coordinate of the turn center and where $x_o$ is the x coordinate of the obstacle identifying point and ye is the y coordinate of the obstacle identifying point.

Figure 12:
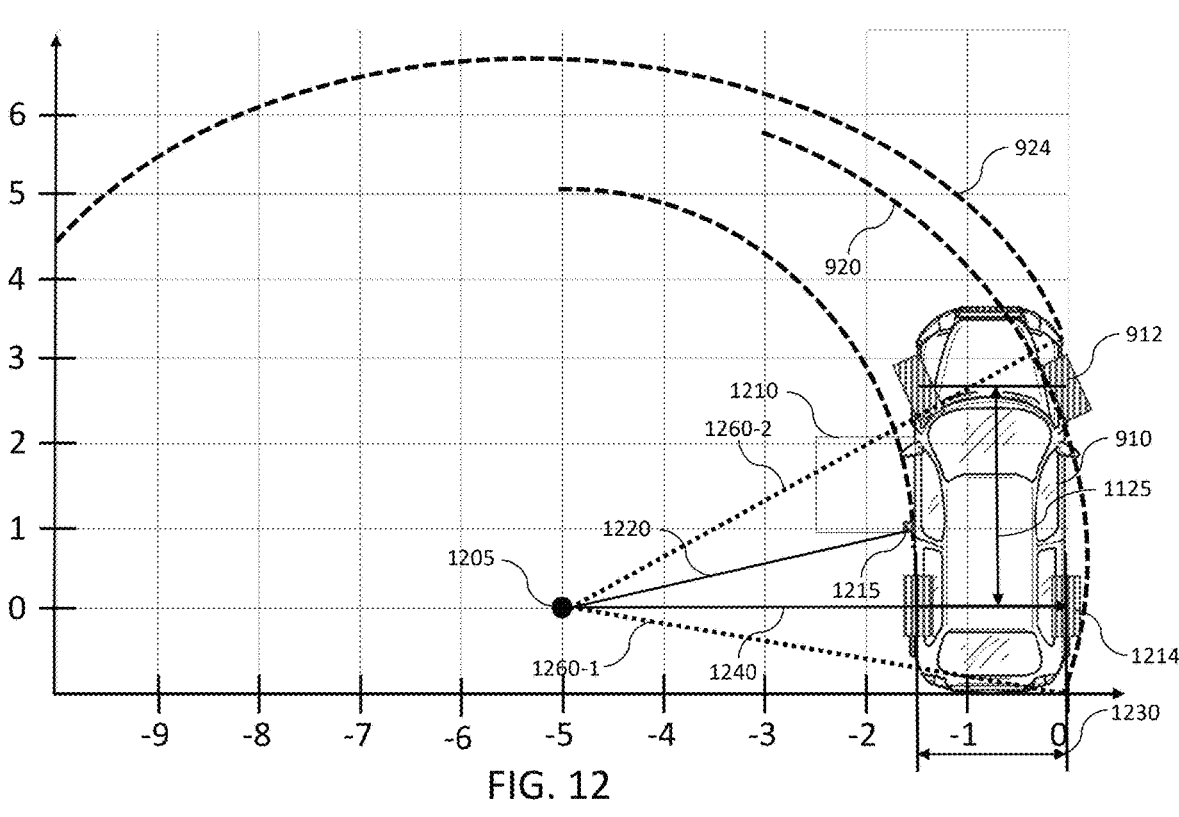
FIG. 12 is an illustration of a vehicle without active rear steer and with inside edge collision checking, in accordance with the disclosure.

FIG. 12 is an illustration of a vehicle scenario 1200 with active rear steer in a straight position with inside edge collision checking, according to an embodiment of the present disclosure. FIG. 12 is based on FIG. 9 but is directed to collision checking on the inside edge of a vehicle. In addition to the applicable descriptions on FIG. 9, scenario 1200 illustrates an obstacle 1210 with its identifying point 1215 located at length 1220 from the turn center point 1205. FIG. 12 also illustrates the vehicle track width 1230. Vehicle 910 may also be described with having front and rear steering angles, $\delta_f$ and $\delta_r$, respectively, where in this example the rear steering angle is set to zero (straight) as shown by rear wheels 1214. As discussed in FIGS. 4A and 4B, the turn center will move towards the rear axle when the rear steering angle is set to zero, hence the turn center point 1205 is moved towards the rear of the vehicle in relationship to turn center 905 of FIG. 11. The turn radius may be shown from vector 1260-1 and vector 1260-2.

Given the front and rear steering angles and the detected object or obstacle 1210, treated as point 1215, the radius 1240 ($R_r$) from the turn center point 1205 to the right rear wheel may be expressed as:

$$R_r = \frac{L\cos\delta_f}{\sin(\delta_f - \delta_r)}$$

Where L=length 1125
Thereby defining the turn center coordinates as:

$$x_c = -R_r\sin\delta_r, \; y_c = R_r\cos\delta_r$$

Further, as the tightest turning point may be in line with turn center $x_c$, as the coordinate frame is on the outer wheel, the track width 1230 denoted as T is subtracted. Thus, the minimum radius may be represented as:

$$R_{min} = -T + \sqrt{x_c^2 + R_r^2 + 2x_cR_r\sin\delta_r}$$

Further, to check for a possible collision is represented as:

$$L_o = \sqrt{(x_c - x_o)^2 + (y_c - y_o)^2}$$

Check for: $R_{min}-L_o<K_{buffer}$, where if less than buffer, collision predicted.
Where $x_c$ is the x coordinate of the turn center and ye is the y coordinate of the turn center and where $x_o$ is the x coordinate of the obstacle identifying point and ye is the y coordinate of the obstacle identifying point
Once a collision possibility is detected, to avoid such an incident, the collision equations for the above discussed front and rear steering angles may be resolved such that a possible collision is averted. Depending upon a vehicle's configuration different approaches may be taken to solve the equations for steering angles. For example, with a traditional front power steering, the front steering angle $\delta_f$ may remain fixed according to the driver's input. Thus:

$$R_r = \frac{L\cos\delta_f}{\sin(\delta_f - \delta_r)}$$
$$x_c = -R\sin\delta_r, \; y_c = R\cos\delta_r$$
$$L_o = \sqrt{(x_c - x_o)^2 + (y_c - y_o)^2}$$

Where in the outside edge case:

$$R_{max} = \sqrt{d^2 + R_r^2 + 2dR_r\sin\delta_r}$$

Solve for $\delta_r$ such that:

$$L_o - R_{max} < K_{buffer}$$

Where in the inside edge case:

$$R_{min} = -T + \sqrt{x_c^2 + R_r^2 + 2x_cR_r\sin\delta_r}$$

Solve for $\delta_r$ such that:

$$R_{min} - L_o < K_{buffer}$$

However, with front steering-by-wire, $\delta_f$ is controllable independently of driver input. In such a case, the goal is to keep a fixed effective steering $\delta_{eff}$ angle consistent with the driver's input. Thus:

$$\delta_{eff} = \tan^{-1}(\tan\delta_f - \tan\delta_r) \xrightarrow{yields} \delta_f = \tan^{-1}(\tan\delta_{eff} + \tan\delta_r)$$

Where the above equations may be solved for both $\delta_f$ and $\delta_r$ and thus both front and rear steering angles may be controlled to the new setpoints.

Figure 13:
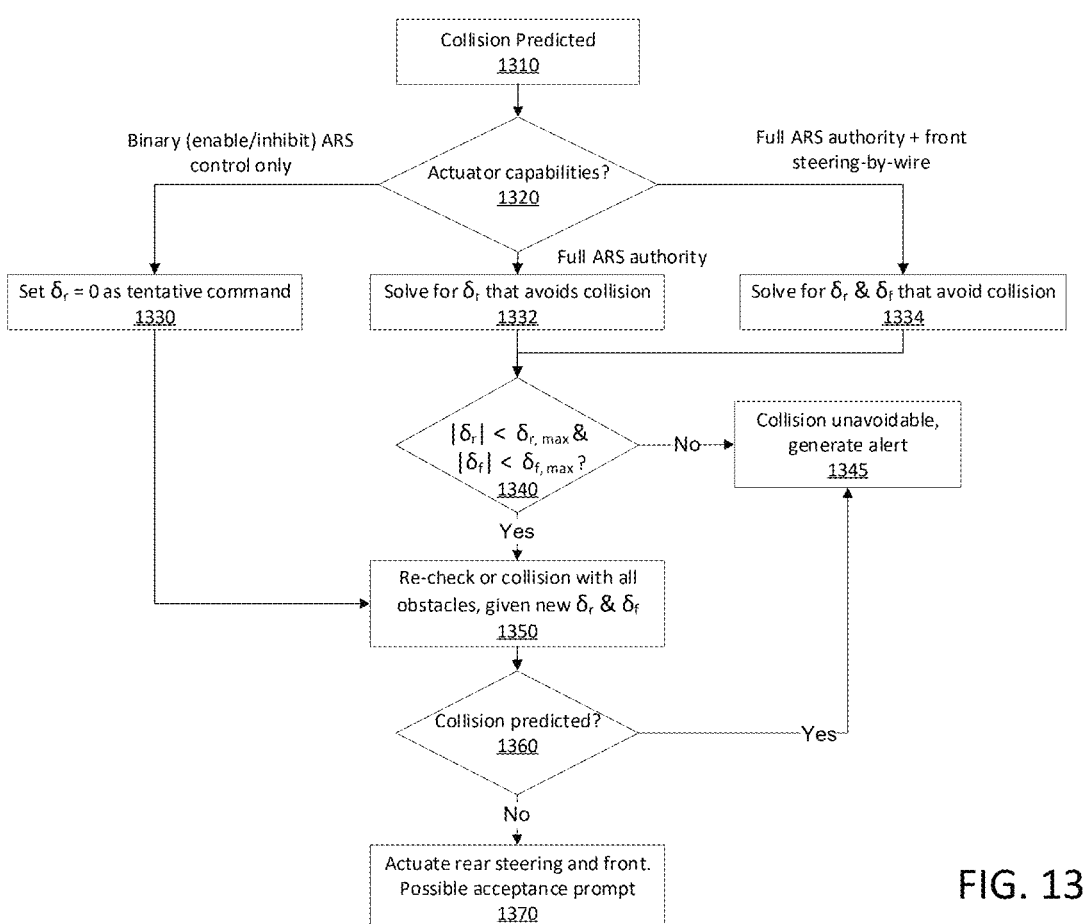
FIG. 13 is a flowchart of collision avoidance with active rear steer, in accordance with the disclosure.

FIG. 13 is a flowchart of collision avoidance with active rear steer once a possible collision has been detected, according to an embodiment of the present disclosure. The flowchart starts at step 1310 where, as discussed above, a possible collision has been detected. At step 1320 a determination may be made as to the capabilities of a specific vehicle regarding its steering actuator capabilities. For example, a vehicle may be equipped with active rear steering that either is engaged or disengaged, a binary choice of enabled or inhibited, in which case the flowchart would proceed to step 1330. However, if the vehicle is equipped with active rear steering that offers may then a binary control, for example proportional control, then the flowchart would proceed to step 1332. If the vehicle is equipped with full active rear steering in addition to steer-by-wire capabilities for the front steering, then the flowchart would proceed to step 1334.

At step 1330, with binary active rear steering, the active rear steering would first be set to zero, or inhibit, such that the rear steering would not engage. If at step 1320 with full active rear steering control, the flowchart would proceed with solving for the rear steering angle $\delta_r$ that avoids a collision as discussed above. If at step 1334 the vehicle is equipped with full active rear steering and front steering-by-wire the flowchart would proceed with solving for both the rear steering angle $\delta_r$ and front steering angle $\delta_f$ that would avoid a collision as discussed above.

At step 1340 a determination may be made that tests if the desired steering angles exceed the steering actuators limits as calculated in steps 1332 and 1334. For example, if theoretically the front steering angle to avoid a collision would be 80 degrees but the physical maximum is 65 degrees, then step 1340 would dictate that the desired steering angle exceeds the maximum limits and hence would proceed to step 1345 where the collision is unavoidable and another action may be generated, such as a warning or alert, or a vehicle command such as braking.

If, however, in step 1340 the desired steering values do not exceed the vehicle's maximums then the flowchart continues to step 1350. Step 1350 provides the ability to re-check or update the collision analysis for new or additional obstacles as the vehicle may have moved or is positioned in a new direction since the initial detection of a possible collision at step 1310. Thus, at step 1360 a determination may be made as to whether a new or existing collision is projected. If the collision is still imminent given the updated steering angles in step 1340 then the flowchart will again proceed to step 1345 where the collision is unavoidable and to generate a driver warning or action. If the collision is no longer predicted the flowchart may continue to step 1370 to actuate a rear and/or front steering command. In some embodiments the driver may be given the opportunity to accept the suggested steering adjustment. In other embodiments the commands may be executed without driver intervention.

Figure 14:
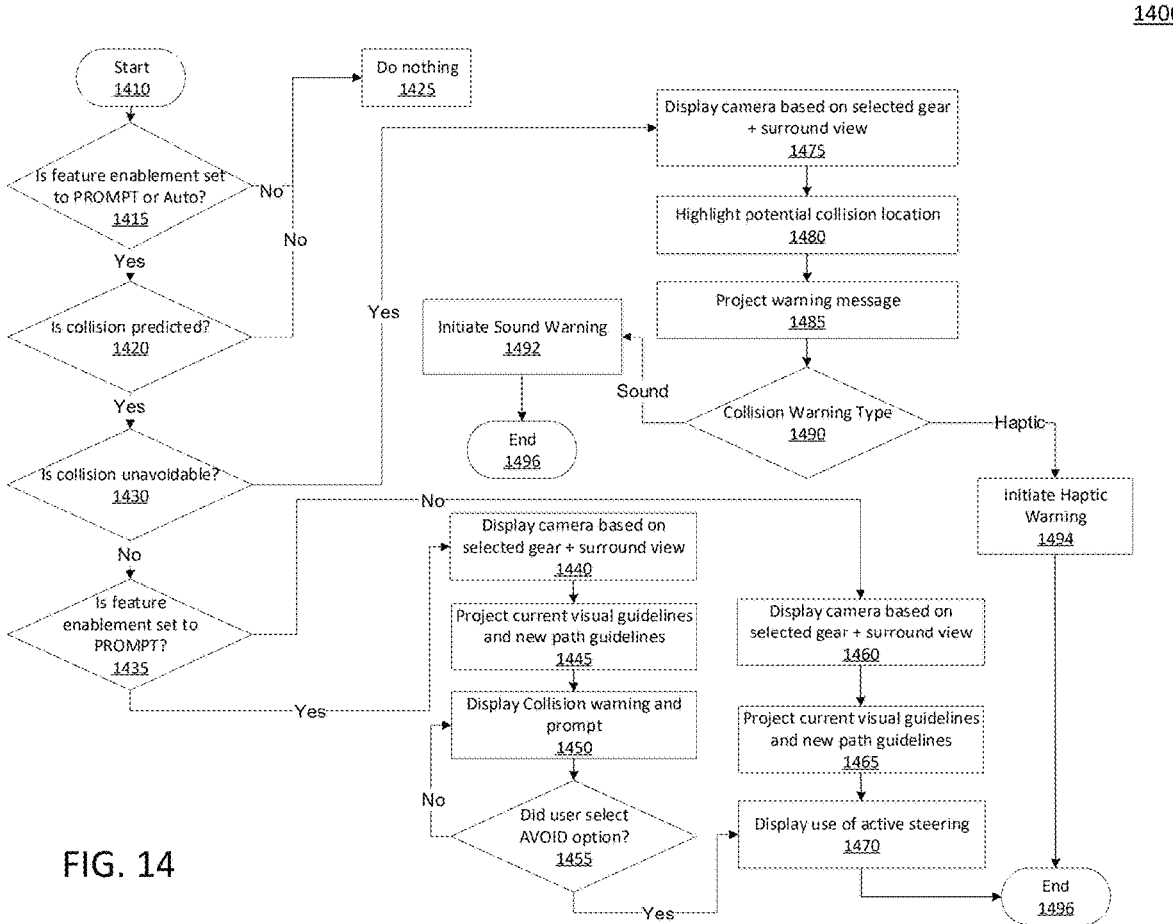
FIG. 14 is flowchart for occupant notification of collision detection and warning, in accordance with the disclosure.

FIG. 14 is a flowchart 1400 for occupant notification of possible collision and associated warnings, according to an embodiment of the present disclosure. Flowchart 1400 starts at step 1410 and proceeds to step 1415 in which a collision detection system feature may be enabled or not. If the feature is not enabled, then the flowchart proceeds to step 1425 and does nothing. However, if the system is enabled for either automatic operation or for occupant prompting then the flowchart proceeds to step 1420. At step 1420 if no collision is predicted then the flowchart will proceed to step 1425 and does nothing. However, if at step 1420 a collision is predicted then at step 1430 a determination may be made on whether the collision is unavoidable or not. If the collision is unavoidable then the flowchart proceeds to step 1435 at which time a determination may be made as to the status of the type of notification enabled. If the notification is enabled to "prompt," or its equivalent, then the flowchart continues to step 1440 where, depending upon the speed of the vehicle may enable a vehicle camera to provide a view of the detected obstacle including a full surround view if applicable. At step 1445 the system may project a current path of the vehicle including a suggested new path to avoid the obstacle. At step 1450 the display may also include collision warning visual or audible warning and additional prompting.

At step 1455 the user may be given an opportunity to select an automatic "avoid" option to allow the vehicle to automatically re-route the vehicle to avoid the obstacle. If the user does not select such an "avoid" option, the flowchart may revert back to step 1450 to further warn the vehicle occupant with a collision warning. However, if the occupant does select an "avoid" option the system may display a message that the vehicle has engaged in the use of active steering at step 1470 and then end the flowchart at step 1496.

However, at step 1435 if the notification is not enabled to "prompt," or its equivalent, but rather may proceed with an automatic operation where the flowchart proceeds to step 1460, which like step 1440, where depending upon the speed of the vehicle may enable a vehicle camera to provide a view of the detected obstacle including a full surround view if applicable. Upon proceeding to step 1465 the system may project a current path of the vehicle and a new path that is intended to avoid the obstacle. The system may then display a message that the vehicle has engaged in the use of active steering at step 1470 and then end the flowchart at step 1496.

If at step 1430 it is determined that the collision is unavoidable then the flowchart proceeds to step 1475 in which depending upon the speed of the vehicle may enable a vehicle camera to provide a view of the detected obstacle including a full surround view if applicable. Proceeding to step 1480 the system may warn the vehicle driver and/or occupants of a potential collision and highlight the location of the collision. For example, the area on the driver's side door, the front left, the back right, etc. At step 1485 the system may project a warning message of the impending collision. At step 1490 a determination may be made as to the type of collision warning. For example, at step 1492 the warning may include a sound warning or at step 1494 the warning may be some type of haptic warning, or both. The flowchart may then end at step 1496.

FIG. 15 illustrates method 1500 for obstacle collision avoidance using vehicular active rear steering, according to an embodiment of the present disclosure. FIG. 15 may begin with step 1505 with determining a front steering angle of a vehicle applied by a driver and an associated rear steering angle of the vehicle, wherein the vehicle is configured with active rear steering. As discussed in FIGS. 2-8, a vehicle may be configured with active rear steering in which the vehicle's turning characteristics are different than a vehicle without active rear steering. As compared in FIGS. 3, 5, and 7, the use of active rear steering may increase or decrease a vehicle's turning radius and turn center. For example, as discussed in FIG. 8A the path of a vehicle may be significantly altered even with the same driver input front steering. If a vehicle is equipped with active anti-phase rear steering and is backing out of a parking space following arc path 530, while the anti-phase rear steering may provide a tighter turn, in this scenario such an assist would be detrimental as arc path 530 may lead to a collision with obstacle 820. In a similar manner, if a vehicle is equipped with active in-phase rear steering and is backing out of a parking space following arc path 730, while the in-phase rear steering may provide a wider turn, in this scenario such an assist would be detrimental as arc path 730 may lead to a collision with obstacle 830.

At step 1510 the method may include detecting, using sensors within the vehicle, a location of an obstacle. As discussed, a vehicle may include a variety of sensors including cameras, radar, Lidar, sonar, and proximity sensors that may detect objects.

At step 1515 the method may include predicting, based on the front steering angle of the vehicle and the associated rear steering angle of the vehicle, a path of the vehicle. As shown in FIGS. 8A and 8B the position of the rear wheels using active rear steering may dramatically affect the steering path of the vehicle. For example, in FIG. 8A the use of active rear steering using anti-phase or in-phase may be used to avoid obstacles, here showing obstacle 820 and obstacle 830 that may be used to avoid inside edge or outside edge obstacles.

At step 1520 the method may continue by predicting, based on the path of the vehicle and the location of the obstacle, a collision between the vehicle and the obstacle. As discussed in FIG. 9 regarding vehicle 910 and the existence of four obstacles such as obstacle 930, obstacle 935, obstacle 940, and obstacle 950. In addition, FIG. 10 explained the process of detecting obstacles and the process to determine if the obstacle may be ignored or further processed to determine if there is a predicted collision. FIG. 13 further explains how once a collision is predicted how the vehicle may avoid such a collision based on the type of rear and forward steering system types of a particular vehicle. FIGS. 11 and 12 also explained in detail the process used to determine a collision, either on the inside or outside edge of the vehicle.

At step 1525 the method may include calculating, based on a location on the vehicle and a location of the obstacle, an adjusting front steering command and an adjusting rear steering command, to modify the path of the vehicle to avoid the predicted collision with the obstacle. Again, as discussed in FIGS. 10-13 the vehicle may determine if there is a possibility of a collision and the steps available to modify either or both front and rear steering angles to avoid a collision. Or, as discussed in FIG. 14, when a collision is unavoidable, the vehicle occupants may be warned of an unavoidable collision.

At step 1530 the method may include sending the adjusting front steering command to a front steering actuator and the adjusting rear steering command to a rear steering actuator. The sending of commands to vehicle actuators may be used to implement the desired steering changes to avoid an obstacle. In addition, as discussed in FIG. 13 at step 1340, a determination may be made that tests if the desired steering angles exceed the steering actuators limits as calculated in steps 1332 and 1334. For example, if theoretically the front steering angle to avoid a collision would be 80 degrees but the physical maximum is 65 degrees, then step 1340 would dictate that the desired steering angle exceeds the maximum limits and hence would proceed to step 1345 where the collision is unavoidable and another action may be generated, such as a warning or alert, or a vehicle command such as braking.

Method 1300 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A method for obstacle collision avoidance using vehicular active rear steering comprising:
   determining a front steering angle of a vehicle applied by a driver and an associated rear steering angle of the vehicle, wherein the vehicle is configured with active rear steering;
   detecting, using sensors within the vehicle, a location of an obstacle;
   predicting, based on the front steering angle of the vehicle and the associated rear steering angle of the vehicle, a path of the vehicle;

predicting, based on the path of the vehicle and the location of the obstacle, a collision between the vehicle and the obstacle;
   calculating, based on a location on the vehicle and a location of the obstacle, an adjusting rear steering command to modify the path of the vehicle to avoid the predicted collision with the obstacle; and
   sending the adjusting rear steering command to a rear steering actuator;
   calculating, based on the location on the vehicle and the location of the obstacle, an adjusting front steering command to modify the path of the vehicle to avoid the predicted collision with the obstacle, and
   sending the adjusting front steering command to a front steering actuator; and
   further comprising generating a warning message if either the front steering command exceeds a threshold value of a front steering actuator constraint or the rear steering command exceeds a threshold value of a rear steering actuator constraint.

2. The method of claim 1, further comprising comparing the adjusting front steering command with a front steering actuator constraint and the adjusting rear steering command with a rear steering actuator constraint.

3. The method of claim 1, further comprising detecting, using the sensors within the vehicle, a location of a second obstacle and determining a possible collision between the vehicle and the second obstacle based on a modified path of the vehicle.

4. The method of claim 1, wherein the detecting the obstacle further comprises filtering, based on a relative position of a predicted collision with the obstacle to the vehicle, a relevance of the potential obstacle.

5. The method of claim 1, further comprising classifying a position of the predicted collision on the vehicle consisting of an inner edge of the vehicle, an outer front corner of the vehicle, or an outer rear corner of the vehicle.

6. The method of claim 1, further comprising displaying the predicted path of the vehicle with the obstacle.

7. The method of claim 6, further comprising displaying a modified path of the vehicle to avoid the predicted collision with the obstacle.

8. The method of claim 1, further comprising automatically generating, without manual intervention, the adjusting front steering command and the adjusting rear steering command.

9. The method of claim 1, further comprising inhibiting the rear steering actuator to avoid a collision, wherein the rear steering actuator comprises a binary control.

10. The method of claim 1, wherein the rear steering actuator comprises a full authority control.

11. The method of claim 1, wherein the front steering actuator comprises a steer-by-wire control.

12. A system for obstacle collision avoidance using vehicular active rear steering, comprising:
   a vehicle configured with active rear steering, wherein a front steering angle of a vehicle is determined by a driver, the vehicle further configured to produce an associated rear steering angle of the vehicle;
   sensors located within the vehicle configured to detect a location of an obstacle;
   a processor configured to predict, based on the front steering angle of the vehicle and the associated rear steering angle of the vehicle, a path of the vehicle;
   the processor configured to predict, based on the path of the vehicle and the location of the obstacle, a collision between the vehicle and the obstacle;

the processor configured to calculate, based on a location on the vehicle and a location of the obstacle, an adjusting front steering command and an adjusting rear steering command, to modify the path of the vehicle to avoid the predicted collision with the obstacle; and a front steering actuator configured to receive the adjusting front steering command; and a rear steering actuator configured to receive the adjusting rear steering command; and wherein the processor is further configured to generate a warning message if either the front steering command exceeds a threshold value of a front steering actuator constraint or the rear steering command exceeds a threshold value of a rear steering actuator constraint.

13. The system of claim 12, wherein the adjusting rear steering command comprises positioning the rear steering actuator anti-phase to a positioning of the front steering actuator.

14. The system of claim 12, further comprising a display system configured to display the predicted path of the vehicle with the obstacle.

15. The system of claim 12, wherein the rear steering actuator comprises a binary control.

16. The system of claim 15, wherein the front steering actuator comprises a steer-by-wire control.

17. The system of claim 12, wherein the processor is further configured to filter, based on a relative position of a predicted collision with the obstacle to the vehicle, a relevance of the potential obstacle.

18. The system of claim 17, wherein the processor is further configured to classify a position of the predicted collision on the vehicle consisting of an inner edge of the vehicle, an outer front corner of the vehicle, or an outer rear corner of the vehicle.

19. The system of claim 12, wherein the rear steering actuator comprises a full authority control.

20. A method for obstacle collision avoidance using vehicular active rear steering comprising:

determining a front steering angle of a vehicle applied by a driver and an associated rear steering angle of the vehicle, wherein the vehicle is configured with active rear steering;

detecting, using sensors within the vehicle, a location of an obstacle;

predicting, based on the front steering angle of the vehicle and the associated rear steering angle of the vehicle, a path of the vehicle;

predicting, based on the path of the vehicle and the location of the obstacle, a collision between the vehicle and the obstacle;

classifying a position of the predicted collision on the vehicle consisting of an inner edge of the vehicle, an outer front corner of the vehicle, or an outer rear corner of the vehicle;

calculating, based on a location on the vehicle and a location of the obstacle, an adjusting front steering command and an adjusting rear steering command, to modify the path of the vehicle to avoid the predicted collision with the obstacle;

comparing the adjusting front steering command with a front steering actuator constraint and the adjusting rear steering command with a rear steering actuator constraint;

displaying the predicted path of the vehicle with the obstacle;

sending the adjusting front steering command to a front steering actuator and the adjusting rear steering command to a rear steering actuator;

displaying a modified the path of the vehicle to avoid the predicted collision with the obstacle;

generating a warning message if either the front steering command exceeds a threshold value of the front steering actuator constraint or the rear steering command exceeds a threshold value of the rear steering actuator constraint; and detecting, using the sensors within the vehicle, a location of a second obstacle and determining a possible collision between the vehicle and the second obstacle based on the modified path of the vehicle.

* * * * *